United States Patent [19]
Duesberg

[11] 3,724,048
[45] Apr. 3, 1973

[54] METHOD OF PREVENTING THE PLUGGING OF LIQUID COOLANT PASSAGES OF A REGENERATIVELY COOLED ROCKET ENGINE THRUST CHAMBER

[75] Inventor: Joe D. Duesberg, Canoga Park, Calif.

[73] Assignee: The United States of America as represented by the Secretary of the Air Force

[22] Filed: Nov. 16, 1971

[21] Appl. No.: 199,126

[52] U.S. Cl. ...............................................29/157 C
[51] Int. Cl. ............................................B21d 53/00
[58] Field of Search........29/157 C, 157.3 R, 157.3 A, 29/157.3 D, 401; 239/127.1, 127.3; 60/260, 267, 271

[56] References Cited

UNITED STATES PATENTS

| 2,722,100 | 11/1955 | Goddard | 60/260 |
| 3,167,909 | 2/1965 | Thielman | 60/271 |
| 3,613,207 | 10/1971 | Malburg | 29/157 C |
| 3,043,103 | 7/1962 | Dent | 29/157 C |

*Primary Examiner*—Charles W. Lanham
*Assistant Examiner*—M. J. Keenan
*Attorney*—Harry A. Herbert, Jr. et al.

[57] ABSTRACT

The liquid coolant passages of a regeneratively cooled rocket engine thrust chamber are prevented from becoming plugged by foreign particles by a method which includes the steps of forming an inlet and an outlet for each liquid coolant passage, with each inlet and each outlet so configurated and so dimensioned as to prevent the entry into the respective liquid coolant passage of foreign particles of a predetermined size and larger which would plug the liquid coolant passage.

4 Claims, 1 Drawing Figure

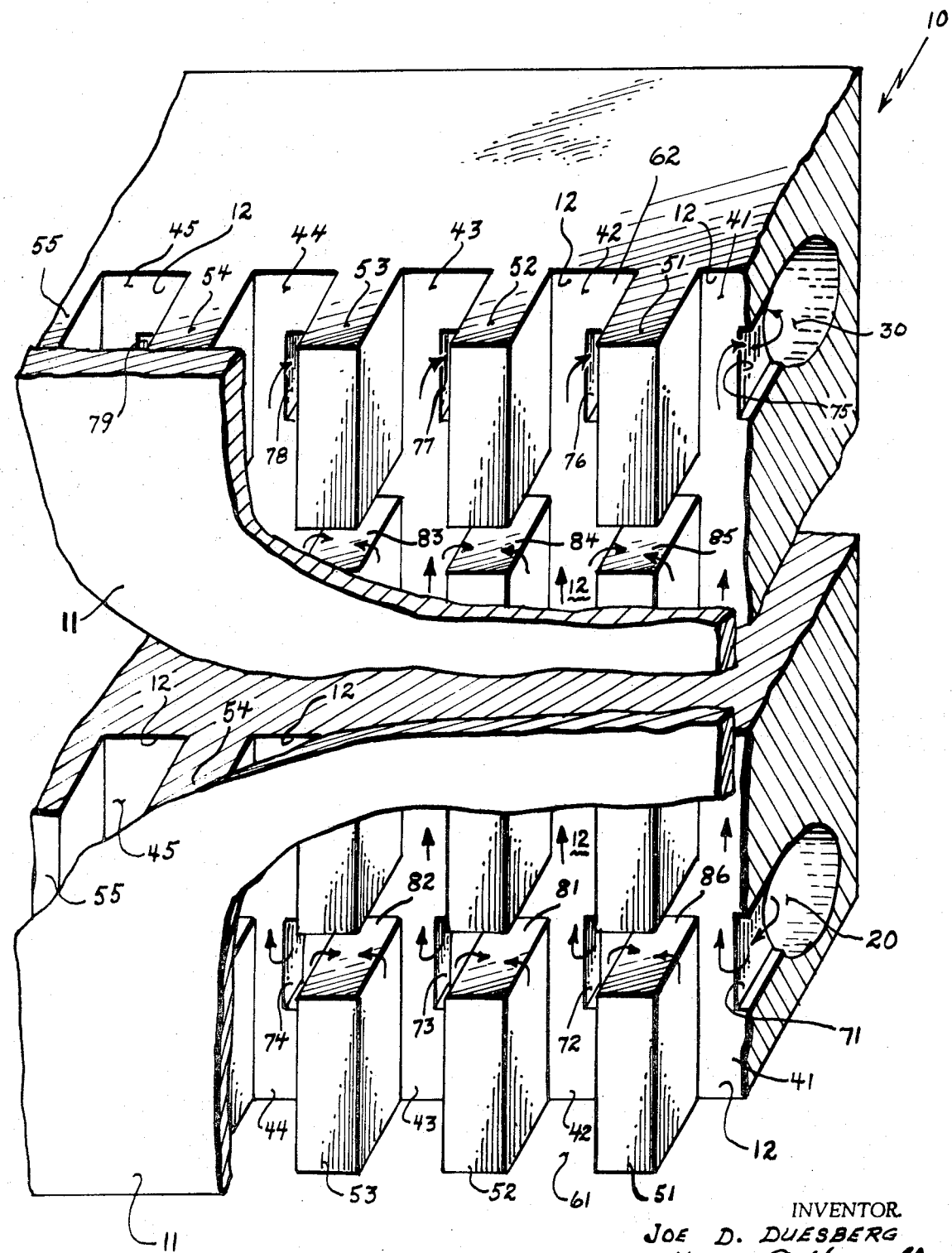

METHOD OF PREVENTING THE PLUGGING OF LIQUID COOLANT PASSAGES OF A REGENERATIVELY COOLED ROCKET ENGINE THRUST CHAMBER

BACKGROUND OF THE INVENTION

This invention relates to regeneratively cooled rocket engine thrust chamber and, more particularly, to a method of preventing the plugging of the liquid coolant passages of a regeneratively cooled rocket engine thrust chamber.

The present trend in regeneratively cooled rocket engine thrust chamber technology is toward channel-wall thrust chamber construction. As a result, small liquid coolant passages are formed between walls in the thrust chamber for use in regeneratively cooling the thrust chamber. The coolant passages, of necessity, are small in size. A typical coolant passage is rectangular in cross-section 0.028 inch in width and 0.016 inch in height. Also, conventionally, a plurality of identical passages are adjacent to each other, i.e. side-by-side. These small coolant passages, more accurately referred to as liquid coolant passages are, therefore, very susceptible to plugging (i.e. blocking or obstructing) by machine chips and other foreign particles which are present or enter into the liquid coolant feed and liquid manifolds primarily, but not solely, as a consequence of thrust chamber machining operations during fabrication, and hot fire testing of the thrust chamber. These small liquid coolant passages can become plugged by the foreign particles either during fabrication operations when there is no coolant flowing in the passages, or during testing or operational use when the regenerative coolant flows into and through the passages and carries with it the foreign particles. Plugging of the liquid coolant passages can result and has resulted in thrust chamber burnout. The seriousness of the situation can be better appreciated if one envisions a rocket engine enroute to a designated target, and thrust chamber burnout occurs with the resultant unintended destruction of the rocket engine.

There exists, therefore, a critical need for a method of preventing the plugging of the liquid coolant passages. I have invented such a method and I have, thereby, fulfilled this critical need and I have also significantly advanced the state-of-the-art.

SUMMARY OF THE INVENTION

This invention pertains to a novel method of preventing the plugging of the liquid coolant passages of a regeneratively cooled rocket engine thrust chamber.

The principal object of this invention is, therefore, to provide a novel, efficient, effective and reliable method of preventing the plugging of the liquid coolant passages of a regeneratively cooled rocket engine thrust chamber, and thereby preventing thrust chamber burnout.

This principal object, and other equally important and related ones, of this invention, will become readily apparent after a consideration of the description of my inventive method and reference to the drawing.

DESCRIPTION OF THE DRAWING

The drawing is a side elevation view, in cross-section, in schematic form, and partially fragmented, of a portion of a typical regeneratively cooled rocket engine thrust chamber which incorporates the results of some of the steps of my inventive method.

DESCRIPTION OF THE METHOD

With reference to the drawing, there is shown a portion of a typical regeneratively cooled rocket engine thrust chamber 10. Also shown are: thrust chamber first wall 11; thrust chamber second wall 12; liquid coolant feed manifold 20; liquid coolant discharge manifold 30; liquid coolant passages, such as 41–45 inclusive; and liquid coolant passage side walls, such as 51–55 inclusive.

It is to be noted that the liquid coolant passages, such as 41–45, are typically adjacent (i.e. side-by-side) and are bounded and defined by side walls, such as 51–55, and thrust chamber first wall 11 and thrust chamber second wall 12. Each liquid coolant passage, such as 41–45, leads from the thrust chamber coolant feed manifold 20 to the thrust chamber coolant discharge manifold 30 and, as its name implies, permits the passage (i.e. the flow) of the liquid coolant from the coolant feed manifold 20, through the coolant passages 41–45, and into the coolant discharge manifold 30. A port, typically of the same configuration and of the same dimensions as a cross-section of the passage, in the thrust chamber second wall 12, conventionally connects the coolant feed manifold 20 with the passage, and an identical port connects the passage with the coolant discharge manifold 30. Neither port for each passage is shown in the drawing, in the interest of maintaining clarity in the drawing and avoiding confusion. Shown in the drawing, however, are inlet slots, such as 71–74 and outlet slots, such as 75–79, which will be discussed later herein. The flow of the liquid coolant, when the thrust chamber is regeneratively cooled, is indicated by the arrows. It is also to be noted that the liquid coolant passages are shown as being open at each end, such as end 61 and 62 for passage 42, as a matter of convenience in explaining my method. The ends of each passage are, of course, closed when the thrust chamber 10 is operational and is being regeneratively cooled.

My method which is intended to be used during the manufacture of a regeneratively cooled rocket engine thrust chamber, is a method of preventing the plugging of the liquid coolant passages of the thrust chamber.

It comprises the following steps: first, at least one end, such as 61 or 62 of each liquid coolant passage, such as 42, is left open.

Then an inlet, such as 72, is formed for each liquid coolant passage, such as 42, in the second wall 12 of the thrust chamber 10 between the liquid coolant feed manifold 20 and each liquid coolant passage. Each inlet, such as 72, is formed by suitable means, such as by Electrical Discharge Machining (hereinafter referred to as EDM); is smaller than the size (i.e. the cross-section) of its liquid coolant passage; and is so configurated and so dimensioned as to prevent the entry into the respective coolant passage of particles of a predetermined size. It is here to be noted that when the phrase "particles of a predetermined size" or the like, is used herein, it is intended to mean foreign particles of a predetermined size and of larger sizes which would plug or tend to plug the respective liquid coolant passage.

Where the cross-section of the typical liquid coolant passage was a rectangle 0.028 inch wide and 0.016 inch high, a rectangular inlet (i.e. a filter slot) 0.010 inch wide and 0.160 inch high was found by me to be effective in preventing the entry into the coolant passage of foreign particles of sizes which would plug the liquid coolant passage. As a related matter, an inlet of that configuration and of those dimensions did not impede the flow of the liquid coolant from the coolant feed manifold 20 through the inlet, such as 72 and into the liquid coolant passage, such as 42.

Next an outlet, such as 76, is formed for each liquid coolant passage, such as 42, in the second wall 12 of the thrust chamber 10 between the liquid coolant discharge manifold 30 and each liquid coolant passage, such as 42. Each outlet, such as 76, is formed by suitable means, such as EDM; is smaller than the size (i.e. the cross-section) of its liquid coolant passage; and is so configured and so dimensioned as to prevent the entry, however unlikely, from the liquid coolant discharge manifold 30 into the respective coolant passage of particles of a predetermined size. Where the cross-section of the typical liquid coolant passage was as stated above a rectangle 0.028 inch wide and 0.016 inch high, a rectangular outlet (i.e. a filter slot) 0.010 inch wide and 0.160 inch high was found by me to be effective in preventing the entry into the coolant passage of foreign particles of sizes which would plug the liquid coolant passage. An outlet of that configuration and of those dimensions did not impede the flow of the liquid coolant from the passage, such as 42, through the outlet, such as 76, and into the coolant discharge manifold 30.

Then each liquid coolant passage, such as 42, is inspected (i.e. examined) by using an open end, such as 61 or 62 of the passage if necessary, to determine whether any passage is plugged by foreign particles. This inspection may be performed by any suitable means, such as by passing a wire into each passage through an open end (or by passing a wire through the passage if both ends are open) or by flowing a liquid into and out of each passage, or by x-raying each passage.

Next any liquid coolant passage, such as 42, which is plugged by foreign particles is unplugged by suitable means, such as by passing a wire into the plugged passage through an open end, such as 61 or 62, (or by passing a wire through the passage if both ends are open) and removing the foreign particles through the open end(s).

Then after it has been verified that all of the liquid coolant passages are unplugged (i.e. open throughout), each open end of each liquid coolant passage is sealed (i.e. closed) by suitable means, such as brazing or welding.

Thereafter any foreign particles which might be in the manifolds 20, 30, or which might enter the manifolds during subsequent thrust chamber fabrication or testing, and which are of sizes which might plug or tend to plug the liquid coolant passages, are trapped (i.e. stopped) by the respective inlet, such as 72, and by the respective outlet, such as 76, and are thereafter prevented from entering and plugging the liquid coolant passages, such as 42.

My method may be modified by the inclusion of the additional step of forming an aperture, such as 81, between adjacent liquid coolant passages, such as 42 and 43 in the side walls, such as 52.

The plurality of apertures, such s 81–86, between adjacent liquid coolant passages together with thrust chamber first wall 11 form, in a sense, a bypass manifold. This additional step of forming apertures may be performed as an added precaution where it is believed that the inlet or outlet, or both, of a coolant passage may become partially or totally plugged, however remote and unlikely the occurrence may be and thereby significantly impair or prevent the flow of the liquid coolant into, through and out of the liquid coolant passage. If such a situation did occur, the apertures, such as 81–86, would permit continued flow of the liquid coolant into, through and out of the liquid coolant passage so affected. It is emphasized, however, that the forming of the bypass apertures, such as 81–86, is of course unnecessary if the inlet, such as 72 and the outlet, such as 76, of each liquid coolant passage, such as 42, are configured and dimensioned to prevent entry into the liquid coolant passage of foreign particles of a predetermined size and larger (i.e. those particles which would plug or tend to plug the liquid coolant passage).

The determination of what sized particles would plug or tend to plug a particular liquid coolant passage will, of course, require analysis of the variable factors involved, such as the sizes of the foreign particles expected to be encountered, in the specific situation concerned. In extreme cases some experimentation may be necessary. However, as has been previously stated and implied, I have found that an inlet and an outlet (i.e. filter slots) each configured in the shape of a rectangle 0.010 inch wide and 0.160 inch high were efficient, effective and reliable in preventing the entry into the typical liquid coolant passage, the cross-section of which was a rectangle 0.028 inch wide and 0.016 inch high, of foreign particles of sizes which would plug or tend to plug the liquid coolant passage.

While there have been shown and described the fundamental features and steps of my inventive method, as applied to and adapted for a particular use, it is to be understood that various substitutions, omissions and adaptations of my inventive method may be made by those of ordinary skill in the art without departing from the spirit of the inventive method. For example, my inventive method may be adapted for use in preventing the plugging of any conduit.

What is claimed is:

1. The method of preventing the plugging of the liquid coolant passages of a regeneratively cooled rocket engine thrust chamber by foreign particles, wherein each liquid coolant passage has two ends, and wherein the liquid coolant passages are adjacent and identical, and wherein the thrust chamber has a liquid coolant feed manifold and a liquid coolant discharge manifold with a thrust chamber wall between the liquid coolant feed manifold and the liquid coolant passages, and with a thrust chamber wall between the liquid coolant discharge manifold and the liquid coolant passages, and wherein said method is to be used during the manufacture of the thrust chamber, comprising the steps of:

a. leaving open at least one end of each liquid coolant passage;

b. forming an inlet, for each liquid coolant passage, in the wall of the thrust chamber between the liquid coolant feed manifold and each liquid coolant passage, with each said inlet smaller in size than its liquid coolant passage, and with each said inlet so configurated and so dimensioned as to prevent the entry into the respective liquid coolant passage of foreign particles of a predetermined size;.

c. forming an outlet, for each liquid coolant passage, in the wall of the thrust chamber between the liquid coolant discharge manifold and each liquid coolant passage, with each said outlet smaller in size than its liquid coolant passage, and with each said outlet so configurated and so dimensioned as to prevent the entry, from the liquid coolant discharge manifold, into the respective liquid coolant passage of foreign particles of a predetermined size;

d. inspecting each liquid coolant passage to determine whether any said liquid coolant passage is plugged by foreign particles;

e. unplugging any liquid coolant passage which is plugged by foreign particles, by using an open end of said liquid coolant passage through which to remove the foreign particles;

f. and, sealing each open end of each said liquid coolant passage;

thereby thereafter preventing the plugging, by foreign particles, of said liquid coolant passages.

2. The method, as set forth in claim 1, wherein the step of forming an inlet includes making the inlet in the shape of a rectangle of dimensions 0.010 inch by 0.160 inch.

3. The method, as set forth in claim 1, wherein the step of forming an outlet includes making the outlet in the shape of a rectangle of dimensions 0.010 inch by 0.160 inch.

4. The method, as set forth in claim 1, comprising the additional step of forming an aperture between adjacent liquid coolant passages.

* * * * *